United States Patent
Tremblay

(10) Patent No.: US 6,694,308 B2
(45) Date of Patent: Feb. 17, 2004

(54) SYSTEM AND METHOD FOR USER ADAPTIVE SOFTWARE INTERFACE

(75) Inventor: Michael A. Tremblay, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 352 days.

(21) Appl. No.: 09/911,337

(22) Filed: Jul. 23, 2001

(65) Prior Publication Data

US 2003/0018625 A1 Jan. 23, 2003

(51) Int. Cl.⁷ .................................................. G06F 17/30
(52) U.S. Cl. ............................ 707/3; 707/10; 707/102; 345/337; 345/714; 345/744
(58) Field of Search ........................... 707/2, 3, 5, 10, 707/6; 345/705, 713, 714, 337, 744; 706/60

(56) References Cited

U.S. PATENT DOCUMENTS

| | | | | |
|---|---|---|---|---|
| 5,544,360 A | * | 8/1996 | Lewak et al. .................. 707/1 |
| 5,787,422 A | * | 7/1998 | Tukey et al. .................. 707/5 |
| 5,991,756 A | * | 11/1999 | Wu .................. 707/3 |
| 5,995,971 A | * | 11/1999 | Douceur et al. ............. 707/102 |
| 5,999,927 A | * | 12/1999 | Tukey et al. .................. 707/5 |
| 6,006,222 A | * | 12/1999 | Culliss .................. 707/5 |
| 6,078,916 A | * | 6/2000 | Culliss .................. 707/5 |
| 6,260,035 B1 | * | 7/2001 | Horvitz et al. .................. 706/60 |
| 6,262,730 B1 | * | 7/2001 | Horvitz et al. .................. 345/707 |
| 6,286,002 B1 | * | 9/2001 | Axaopoulos et al. .......... 707/10 |
| 6,339,436 B1 | * | 1/2002 | Amro et al. .................. 345/714 |
| 2001/0017632 A1 | * | 8/2001 | Goren-Bar .................. 345/744 |

OTHER PUBLICATIONS

Louchard, Guy et al., "Average Profile and Limiting Distribution for a Phrase Size in the Lempel–Ziv Parsing Algorithm", IEEE Transactions On Information Theory, vol. 41, No. 2, Mar. 1995, pp. 478–488.*

* cited by examiner

Primary Examiner—Shahid Alam

(57) ABSTRACT

In one embodiment, the present invention is directed to a method for providing an adaptive computer user interface. The method may comprise the steps of: monitoring operating system events associated with input from a user to generate a series of operating system events; determining whether said series of operating system events is unrelated; and when said series of operating system events is unrelated, offering help to said user.

16 Claims, 3 Drawing Sheets

SYSTEM AND METHOD FOR USER ADAPTIVE SOFTWARE INTERFACE

TECHNICAL FIELD

The present invention is related to a system and method for providing a software user interface and more particularly to a system and method for providing an adaptive software user interface.

BACKGROUND

Computer systems and consumer software applications have increasingly become more powerful and more complex. Consumer software applications frequently provide diverse functionality requiring complex interactions between a user and the user interface. The complexity of these interactions is quite often too cumbersome for most users. For example, certain procedures or routines associated with a consumer software application may be used relatively infrequently. A user may be required to relearn the various menu selections necessary to perform such procedures or routines due to the length of time involved between repetition of the procedures or routines.

To address these issues, software producers have developed various help topic lists. In general, an alphabetical list of help topics is presented to a user when the user clicks on an appropriate menu or icon. The user may scroll through the list. Alternatively, the user may perform a rudimentary text search to identify a specific topic in the list. However, this approach is problematic in many respects. In particular, it requires the software producer to identify each and every potential help topic before release of the software product. The help topic list is then sufficiently large that it does not allow user to quickly locate help topics of interest. Instead, the user must cull through numerous selections before being able to obtain desired information.

SUMMARY OF THE INVENTION

In one embodiment, the present invention is directed to a method for providing an adaptive computer user interface. The method may comprise the steps of: monitoring operating system events associated with input from a user to generate a series of operating system events; determining whether said series of operating system events is unrelated; and when said series of operating system events is unrelated, offering help to said user.

In another embodiment, the present invention is directed to a system for providing computer user interface. The system may comprise a means for monitoring user input; a means for determining whether a series of events is a unrelated series; and a means for offering assistance to said user, wherein said means for offering assistance is operable to offer assistance when said means for determining determines that said series of events is a unrelated series.

DETAILED DESCRIPTION

Figure 1A:
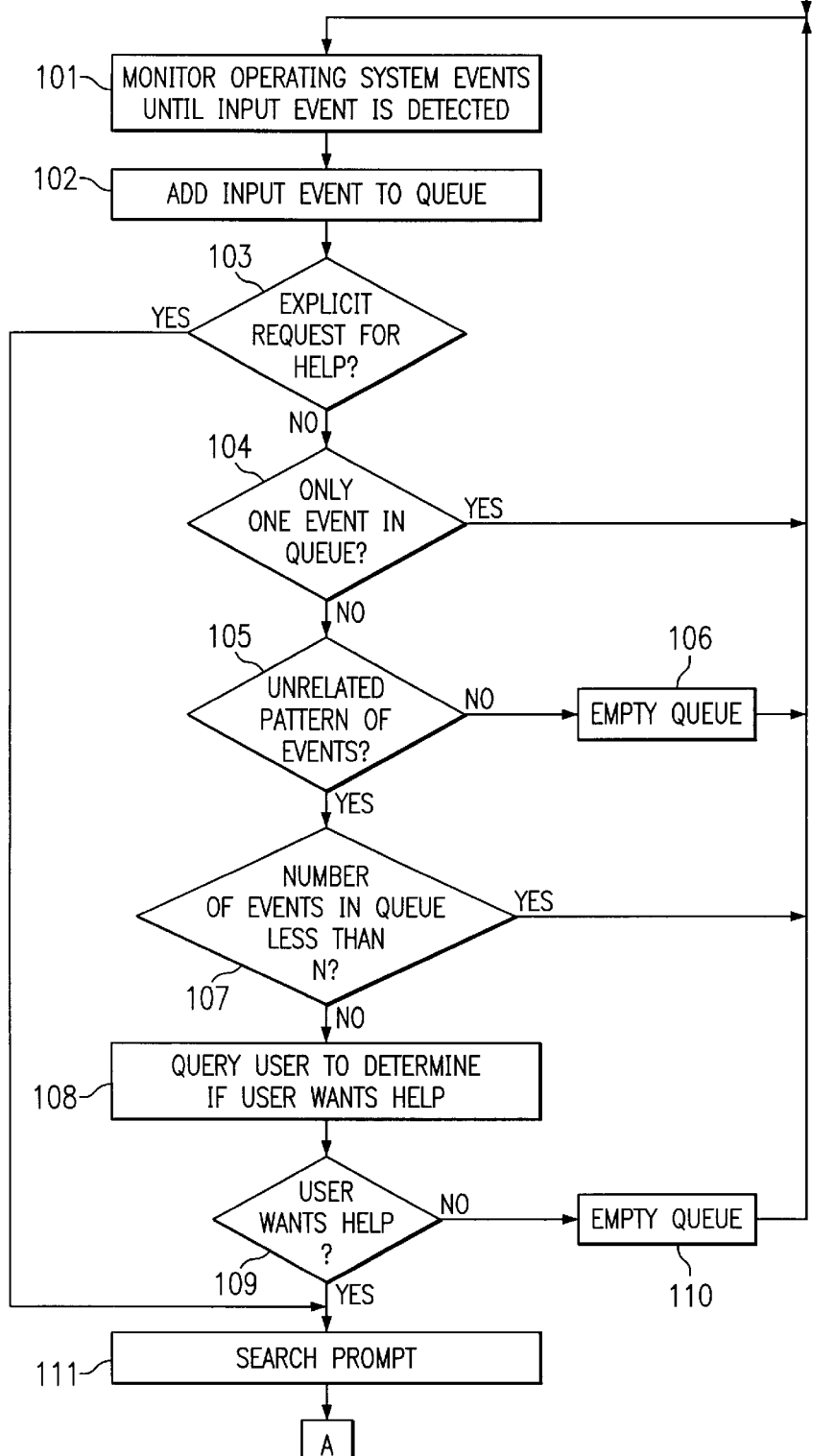
FIG. 1 depicts exemplary steps according to a preferred embodiment of the present invention.
Figure 1B:
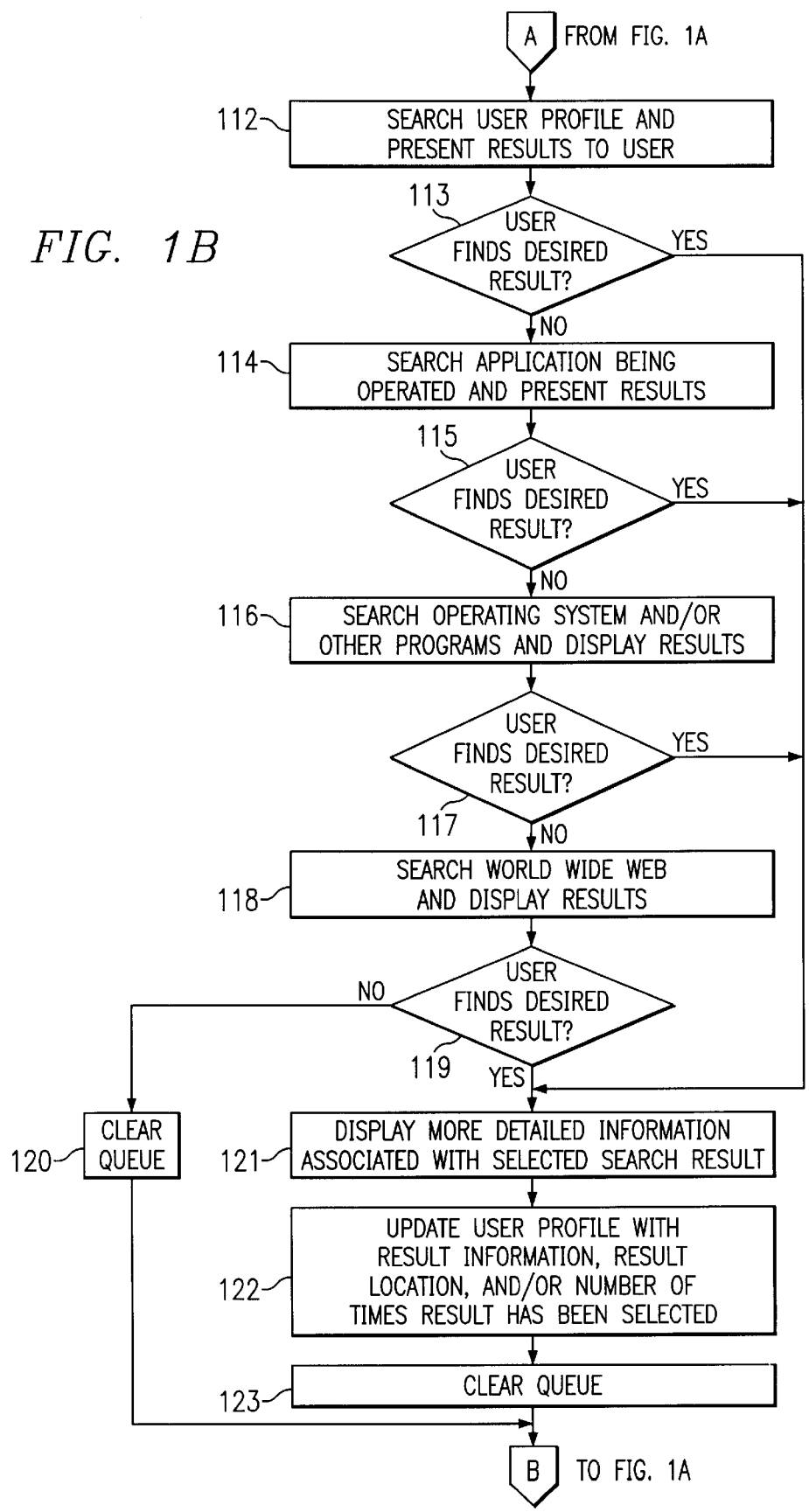

FIG. 1 depicts exemplary steps to illustrate an embodiment of the present invention. In this preferred embodiment of the present invention, various steps occur as operations or instructions performed by a modification to an operating system. In particular, operating system events are monitored to detect user actions. By doing so, this embodiment is capable of analyzing input associated with a plurality of applications, programs, and system components.

In step 101, a detector algorithm monitors user input information from the operating system until an input event occurs (a move event associated with a mouse, a keystroke, a peripheral click, and/or the like). In step 102, the detector algorithm adds the event to an event queue. In step 103, the input event is examined to determine whether it is an explicit request for help (e.g., pushing the F1 button or clicking on a help icon). If the input event is an explicit request for help, the detector algorithm proceeds to step 111. If the input event is not an explicit request for help, the detector algorithm determines whether this is the only event in the event queue (step 104). If this is the only event in the event queue, the detector algorithm returns to step 101.

If the event is not the only event in the event queue, the detector algorithm determines whether the series of events in the event queue is a pattern of unrelated events (step 105). This analysis attempts to determine whether the user is searching for information or may require help. The analysis may attempt to ascertain whether the user has accessed ordinary search facilities. Additionally or alternatively, this analysis attempts to determine whether the user has repeatedly accessed program functionality without completing any specific tasks. For example, the analysis may determine that a series of events is unrelated if a user accesses several menus without making a selection or accesses different programs. In this step, it may also be desirable to verify the timing relationship between events.

If events are separated by too much time, analysis of the events of the series may not provided useful information and should be cleared from the queue (step 106). If the set of events in the event queue is determined to be related in some manner, the event queue is emptied (step 106). Specifically, a related set of events is most likely associated with a specific action or actions that a user explicitly desires to accomplish. Accordingly, there is no necessity of offering help to a user. The event queue may be emptied by resetting the pointer defining the end of the queue thereby allowing new events to be written into the appropriate memory locations. Also, the detector algorithm returns to step 101.

If the set of events is a unrelated pattern of events, the number of events in the queue is examined (step 107). If the number of events is less than a predetermined number N, the detector algorithm returns to step 101. The predetermined number N may be selectively chosen such that the event sample length is sufficiently large to avoid interrupting the user prematurely. The predetermined number N may be adapted to an individual user in response to user queries regarding whether the user desires help. For example, the predetermined number may be changed based upon the number of times that a user responds negatively or positively to the offer for assistance. If the number of events in the queue is less than N, the detector algorithm returns to step 101.

If the number of events is equal to N, the detector algorithm queries the user to determine whether the user wants help (step 108). If the user does not desire help (step 109), the event queue is emptied (step 110) and the detector algorithm returns to step 101.

If the user does desire help, the detector algorithm initiates a search prompt (step 111). The search prompt may allow a user to enter a search topic via a keyword, keywords, or a natural language string. The search prompt may request multiple search terms and/or include boolean operators. The detector algorithm will then perform a hierarchical search based upon the user input. The detector algorithm will first search previous search results stored in a user profile (step 112). The search results from the user profile are presented to the user. The user may click on a description associated with such search results. If the user clicks on a specific result or otherwise indicates that a particular result is pertinent to the user's initial request for help (step 113), the detector algorithm proceeds to step 121.

If pertinent information is not found by searching the user profile, the detector algorithm performs a search of the help library associated with the particular application currently being operated by the user (step 114). The search results are presented to the user. If the user clicks on a specific result or otherwise indicates that a particular result is pertinent to the user's initial request for help (step 115), the detector algorithm proceeds to step 121.

If pertinent information is not found by searching the help library of the particular application currently being operated, the detector algorithm may perform a search of the help libraries of the operating system and/or other applications installed on the user system (step 116). If the user clicks on a specific result or otherwise indicates that a particular result is pertinent to the user's initial request for help (step 117), the detector algorithm proceeds to step 121.

If pertinent information is not found locally, the world wide web may be searched for the pertinent information (step 118). In particular, technical service websites and user group websites may be queried to obtain pertinent information. If the user clicks on a specific result or otherwise indicates that a particular result is pertinent to the user's initial request for help (step 119), the detector algorithm proceeds to step 121.

If no pertinent information has been identified, the detector algorithm clears the event queue (step 120) and returns to step 101. Alternatively, the search may be repeated by prompting the user for more detailed search terms in accordance with step 111.

In step 121, more detailed information associated with the selected search result or results is present to the user. In step 122, the desired information and/or the location(s) thereof are stored or otherwise designated in a user profile. The location of the information may be stored for information retained locally on the user's system. However, it may prove advantageous to cache the actual information obtained from websites for future retrieval. First, caching web content is advantageous in that it will reduce the latency associated with future retrievals. Secondly, it is possible that the location of the content may change. For example, the URL of the website may be changed before the next retrieval of the information. Caching information may ensure that valuable information is not lost.

Also, the number of times that a particular search result has been selected may be retained in the user profile. This number may be used as a weighting factor for ordering search results for presentation to the user. Additionally, the current application being operated by the user may be stored. This information may also be used as a weighting factor for ordering search results for presentation to the user.

It shall be appreciated that by utilizing a user profile, the present invention is capable of adapting to the specific needs of an individual user. The help facilities are not arbitrarily constrained. Specifically, the adaptive nature of the present invention causes categories of help information related to system functionality that is of the greatest interest to a user to be brought to the fore of search results. Thus, the user is able to quickly identify topics of interest and subsequently retrieve those topics of interest with very little effort. This aspect of the present invention is quite advantageous given the complexity of recent software programs. New software functionality need not confuse the user. Subject matter related to new software functionality may be added to a help facility without obscuring more rudimentary topics of greater interest to the user. Specifically, topics of particular interest will be retained in the user's profile thereby ensuring that additions to the help facilities do not produce confusion.

Additionally, it shall be appreciated that implementing the present invention via a modification of the operating system is quite advantageous. Specifically, many user questions pertain to topics that possess relevance beyond a specific application. For example, a simple question directed to printing may not be completely answered by the help facilities of a specific application. Instead, useful information may be retained in the operating system help facilities. Moreover, the user question may be directed to a more pragmatic, rather than technical, concern. This type of information would more likely be set forth in a user group website, rather than in an application help facility. By preferably implementing the present invention in the operating system, the present invention may leverage each source of potentially useful information no matter which application is currently being operated by the user.

It shall further be appreciated that embodiments of the present invention are especially valuable for novice users. In particular, detecting whether a series of events presents a unrelated pattern allows help facilities to be presented to a novice user without requiring the user to perform any particular task. Thus, if it is determined that the user is lost or confused, help may be offered immediately thereby easing user frustration.

When implemented via executable instructions, various elements of the present invention are in essence the code defining the operations of such various elements. The executable instructions or code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 2:
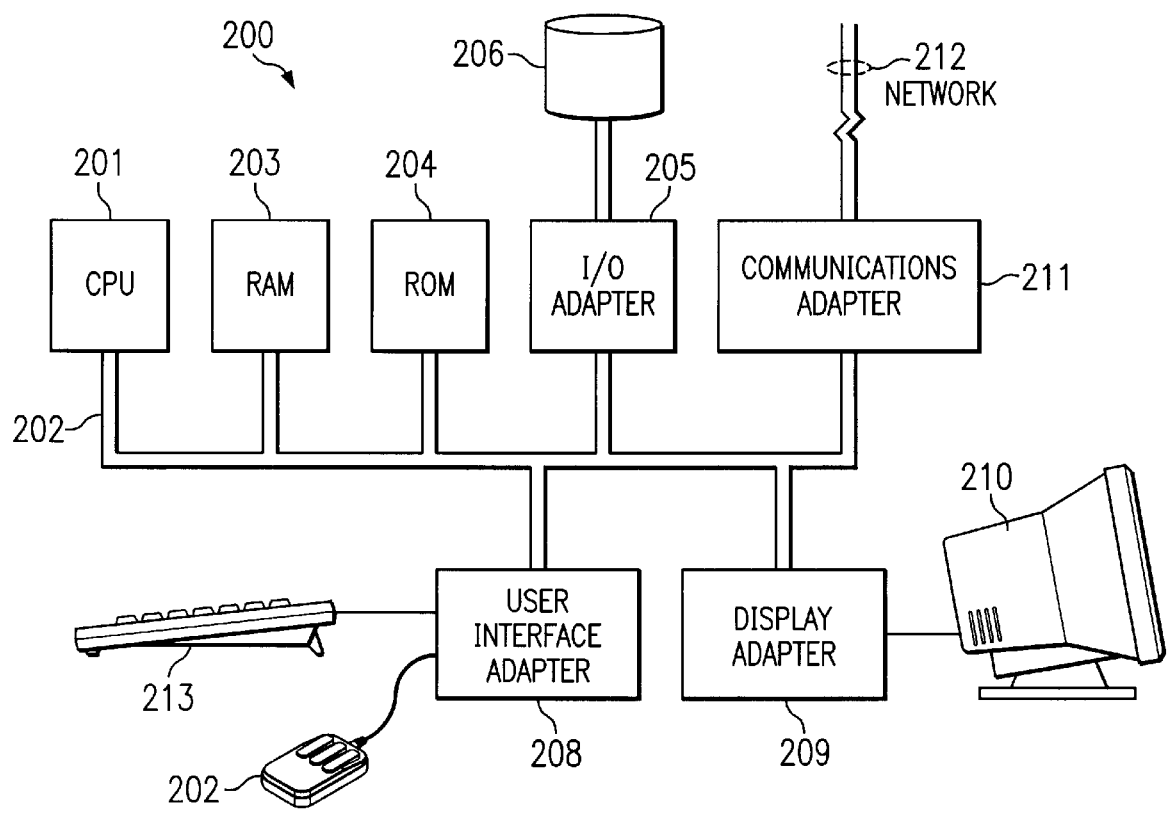
FIG. 2 depicts a block diagram of a computer system which is adapted to use the present invention.

FIG. 2 depicts exemplary computer system 200 on which embodiments of the present invention may be implemented. Central processing unit (CPU) 201 is coupled to system bus 202. CPU 201 may be any general purpose CPU. Suitable processors, without limitation, include any processor from the Itanium™ family of processors, such as the McKinley processor, available from Hewlett-Packard Company, or an PA-8500 processor also available from Hewlett-Packard Company. However, the present invention is not restricted by the architecture of CPU 201 as long as CPU 201 supports the inventive operations as described herein. Additionally, it shall be appreciated that the present invention is not limited to single processor platforms. For example, embodiments of the present invention may be advantageously adapted to multi-processor systems. Computer system 200 includes random access memory (RAM) 203, which may be SRAM, DRAM, or SDRAM, as examples. Computer system 200 includes ROM 204 which may be PROM, EPROM, or EEPROM, as examples. RAM 203 and ROM 204 may hold user and system data and programs as is well known in the art.

Computer system 200 also includes input/output (I/O) adapter 205, communications adapter 211, user interface 208, and display adapter 209. I/O adapter 205 connects to storage devices 206, such as one or more of hard drive, CD drive, floppy disk drive, tape drive, to computer system 200. Communications adapter 211 is adapted to couple computer system 200 to a network 212, which may be one or more of telephone network, local (LAN) and/or wide-area (WAN) network, Ethernet network, and/or Internet network. User interface 208 couples user input devices, such as keyboard 213 and pointing device 207, to computer system 200. Display adapter 209 is driven by CPU 201 to control the display on display device 210.

What is claimed is:

1. A computer readable medium containing processor executable instructions for providing assistance to a user, comprising:

code for monitoring user events;

code for determining whether a series of user events is unrelated;

code for offering assistance to a user, wherein said code for offering assistance is operable upon determination by said code for determining that said series of user events is unrelated;

code for prompting a user for search terms;

code for conducting a hierarchical search utilizing said search terms, wherein said code for conducting is operable to first search content previously designated in a user profile;

code for presenting search results to a user;

code for receiving user input selecting a search result of said search results; and code for maintaining a count of a number of times that a user has selected said selected search result in said user profile, wherein said code for presenting is operable to present search results weighted by said number of times.

2. The computer readable medium of claim 1 wherein said executable instructions are operable to execute as a modification to an operating system.

3. The computer readable medium of claim 1 wherein said code for conducting is operable to search user websites when information is not obtained locally on a system executing said code for conducting.

4. The computer readable medium of claim 1 further comprising:

code for receiving user input selecting a search result of said search results; and code for designating said selected search result in said user profile.

5. A method for providing an adaptive computer user interface, comprising:

monitoring operating system events associated with input from a user to generate a series of operating system events;

determining whether said series of operating system events is unrelated; and when said series of operating system events is unrelated, offering help to said user, wherein said step of monitoring includes placing operating system events into a queue having a dynamic length, and wherein said step of offering includes monitoring the dynamic length of said queue and waiting until the dynamic length of said queue equals a predetermined number before offering help to the user.

6. The method of claim 5 further comprising:

prompting the user for search terms; and performing a search of at least one help facility of an application currently being executed by the user utilizing said search terms.

7. The method of claim 6 further comprising:

receiving input that a search result is pertinent to the user; and designating said search result in a user profile.

8. The method of claim 7 further comprising:

performing a second search, wherein said second search is operable to first search content associated with designations in said user profile.

9. The method of claim 5 further comprising:

receiving input from said user indicating that search terms do not include information useful to the user; and performing a search of at least one other help facility.

10. The method of claim 9 wherein said at least one other help facility is associated with the operating system.

11. The method of claim 9 wherein said at least one other help facility is associated with a user group web site.

12. The method of claim 5 further comprising:

changing the predetermined number based upon a percentage of times that the user provides input indicative that the user desires help in response to the offer of help.

13. A system for providing an adaptive computer user interface to offer help to a user, comprising:

a processor for executing code;

a user profile containing designations of previous search results selected by the user during previous user help searches;

a first set of code operable to analyze user input events to determine whether the user input events are unrelated, wherein said first set of code is operable to analyze a minimum predetermined number of user input events;

a second set of code operable to query the user to determine if the user desires help, wherein said second set of code is operable when said first set of code determines that said user input events are unrelated; and a third set of code operable to conduct a hierarchical search of help resources, wherein said third set of code first searches help content designated in said user profile before performing general purpose searches.

14. The system of claim 13 further comprising:

another set of code operable to modify said minimum predetermined number based upon user responses to said query presented by said second set of code.

15. The system of claim 13 further comprising:

another set of code operable to present search results to said user.

16. The system of claim 13 further comprising:

another set of code operable to update said user profile when said user selects a particular search result of search results.

* * * * *